E. M. HANSLEY & H. WILL.
FRUIT PICKER.
APPLICATION FILED FEB. 17, 1910.
971,005.
Patented Sept. 20, 1910.
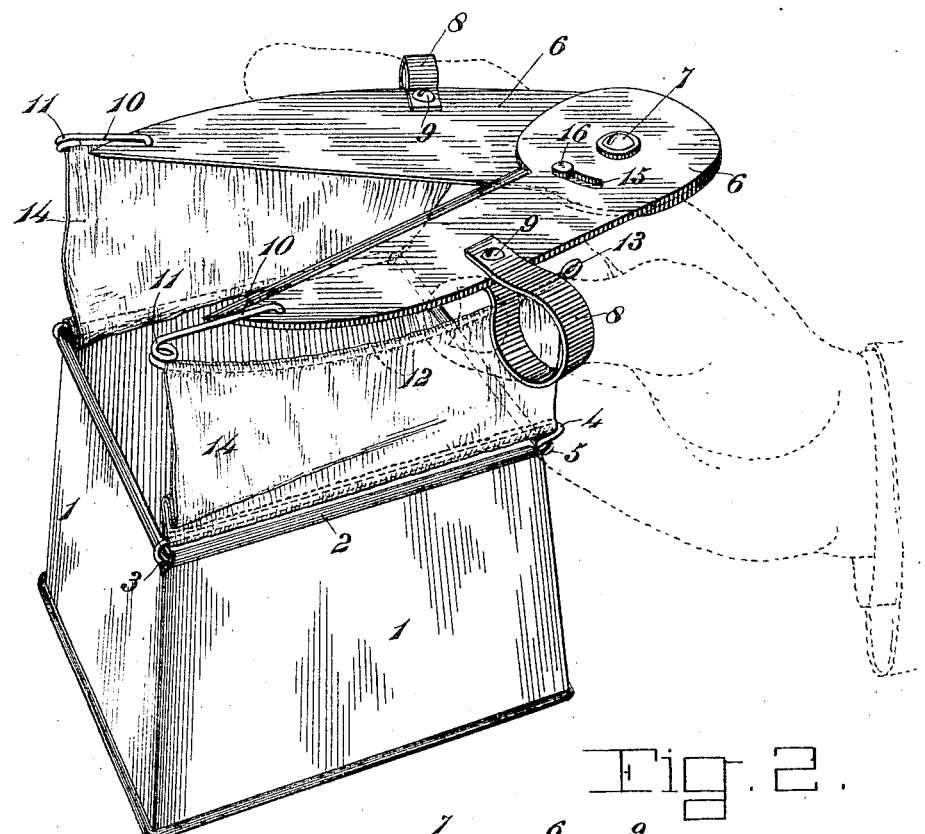
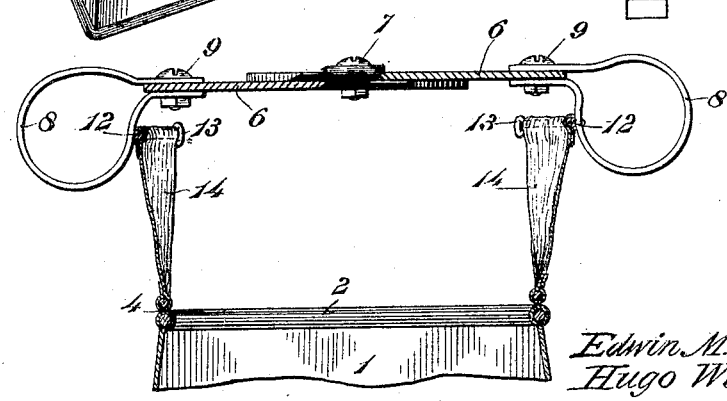
Witnesses
Harry King
Wm. C. Bagger
Inventors
Edwin M. Hansley
Hugo Will
By Victor J. Evans
Attorney

UNITED STATES PATENT OFFICE.

EDWIN M. HANSLEY AND HUGO WILL, OF WILLIAMSBURG, MICHIGAN.

FRUIT-PICKER.

971,005.  Specification of Letters Patent.  Patented Sept. 20, 1910.

Application filed February 17, 1910. Serial No. 544,443.

*To all whom it may concern:*

Be it known that we, EDWIN M. HANSLEY and HUGO WILL, citizens of the United States of America, residing at Williamsburg, in the county of Grand Traverse and State of Michigan, have invented new and useful Improvements in Fruit-Pickers, of which the following is a specification.

This invention relates to devices for picking cherries, plums and other small fruits, and it has for its object to produce a device of this class of simple and durable construction which may be efficiently used for the purpose of gathering small fruits rapidly and conveniently and without injury to the fruit.

With these and other ends in view, which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the invention may be resorted to when desired.

In the drawing, Figure 1 is a perspective view of a fruit picker constructed in accordance with the invention. Fig. 2 is a vertical transverse sectional view of the same.

Corresponding parts in both figures of the drawing are designated by like characters of reference.

A receptacle 1 is provided, the same consisting of a box of rectangular or other suitable shape, and the same being preferably constructed of sheet metal and provided at its upper edge with a bead 2 reinforced by a wire 3, which latter is exposed at the corners of the box, as shown. Upon the exposed corners of the reinforcing wire are fitted the ends of wire loops 4, which latter are disposed longitudinally of the box, and the terminal ends of said loops being provided with eyes 5 engaging the reinforcing wire at the corners of the box, as clearly seen in Fig. 1. A cutting implement is provided consisting of shear blades 6, 6 which are pivotally connected by a pin or bolt 7, each of said blades being provided with a finger loop 8 secured adjacent to its outer edge by means of a screw or bolt 9. The blades 6 are relatively short and wide, said blades being provided with beveled cutting edges, as shown.

Suitably attached to each of the blades 6 near the point thereof is an arm 10 made of resilient wire, the same being bent at a suitable distance in advance of the point of the blade to which it is attached to form a coil 11 from which an arm 12 is extended rearwardly adjacent to the outer edge of the blade, said arm 12 being suitably attached to the finger loop. Each of the arms 12 terminates at its rear end in an eye 13 which is formed thereupon to avoid a raw edge which might injure the hand of the operator. The arm 12 at each side of the cutting device is connected with the loop 4 at the corresponding side of the box by an apron 14 made of flexible, preferably textile, material, which serves to guide the fruit severed by the cutting apparatus into the box or receptacle below without injury to the fruit and without danger of its being lost.

One of the cutting blades 6 is provided with an arcuate slot 15 concentric with the pivot 7, and the other cutting blade is provided with a lug or stud 16 engaging said slot and constituting a stop, whereby the closing as well as the opening movement of the blades will be limited.

From the foregoing description taken in connection with the drawing hereto annexed the operation and advantages of this invention will be readily understood. The operator holds the device by inserting his thumb and finger into the loops provided for the purpose, the palm of the hand combining with the aprons 14 to form a guide, whereby the fruit that is being severed will be directed into the box or receptacle. The arms 10, 12, which are connected by the coil 11 in advance of the point of each blade, will serve to direct the stems of the fruits that are to be picked between the edges of the blades without danger of the fruit being injured by the points of the blades.

While the receptacle of this device may be of any desired dimensions, it is preferably made small enough to be handily carried, thus rendering the device capable of being conveniently used for the purpose of gathering fruit that would be inaccessible if a larger gathering device were used.

The device is simple in construction, effective in operation and may be used without severely straining the hand of the operator.

Having thus described the invention, what is claimed as new, is:—

1. In a device of the character described, a receptacle, a cutting apparatus comprising pivotally connected blades having loops connected therewith, arms connected with the loops, arms extending forwardly from the blades, coils connecting said arms together, and flexible aprons connecting the arms adjacent to the blades with the receptacle.

2. In a device of the character described, a rectangular receptacle having a beaded upper edge and a reinforcing wire interposed at the corners of the receptacle, longitudinally disposed loops connected with the reinforcing wire, a cutting device consisting of pivotally connected blades having finger loops connected therewith, arms connected with the finger loops and disposed adjacent to the outer edges of the blades, arms connected with and extending forwardly from the blades, coils connecting the latter arms with the arms attached to the finger loops, and flexible aprons connecting the arms located adjacent to the outer edges of the blades with the loops connected with the receptacle.

In testimony whereof we affix our signatures in presence of two witnesses.

EDWIN M. HANSLEY.
HUGO WILL.

Witnesses:
GEO. PULACE,
RALPH D. WHITE.